United States Patent
Tsutsumi et al.

(10) Patent No.: US 7,184,769 B2
(45) Date of Patent: Feb. 27, 2007

(54) DIVERSITY HANDOVER CONTROL APPARATUS AND METHOD

(75) Inventors: Noriyuki Tsutsumi, Kanagawa (JP); Hidenari Kato, Kanagawa (JP); Hisashi Takeshita, Kanagawa (JP); Shogo Ito, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 686 days.

(21) Appl. No.: 09/968,288

(22) Filed: Oct. 1, 2001

(65) Prior Publication Data

US 2002/0072372 A1 Jun. 13, 2002

(30) Foreign Application Priority Data

Oct. 2, 2000 (JP) .............................. 2000-302734

(51) Int. Cl.
*H04Q 7/20* (2006.01)

(52) U.S. Cl. ...................... 455/442; 455/436; 455/525; 370/331

(58) Field of Classification Search ................ 455/436, 455/437, 439, 440, 442, 515, 524, 525, 450, 455/509; 370/331, 332, 333
See application file for complete search history.

(56) References Cited

U.S. PATENT DOCUMENTS

| | | | | |
|---|---|---|---|---|
| 5,491,837 A * | 2/1996 | Haartsen .................... 455/62 |
| 5,832,368 A * | 11/1998 | Nakano et al. ............ 455/63.1 |
| 5,926,470 A | 7/1999 | Tiedemann, Jr. ............. 370/334 |
| 5,933,787 A | 8/1999 | Gilhousen et al. ............ 455/562 |
| 6,055,428 A * | 4/2000 | Soliman ..................... 455/437 |
| 6,078,817 A * | 6/2000 | Rahman .................. 455/452.1 |
| 6,097,957 A * | 8/2000 | Bonta et al. ................ 455/446 |
| 6,151,502 A * | 11/2000 | Padovani et al. ........... 455/442 |
| 6,161,015 A | 12/2000 | Birchler et al. ............. 455/440 |
| 6,181,943 B1 | 1/2001 | Kuo et al. .................. 455/437 |
| 6,195,551 B1 * | 2/2001 | Kim et al. .................. 455/436 |
| 6,353,602 B1 | 3/2002 | Cheng et al. ............... 370/332 |
| 6,381,458 B1 * | 4/2002 | Frodigh et al. ............. 455/442 |
| 6,393,287 B1 * | 5/2002 | Munekata et al. .......... 455/442 |

(Continued)

FOREIGN PATENT DOCUMENTS

CN 1234713 A 11/1999

(Continued)

OTHER PUBLICATIONS

Official Notice of Rejection Case No. DCMH130327 Patent Application No. 2001-306457.

*Primary Examiner*—William Trost
*Assistant Examiner*—James D Ewart
(74) *Attorney, Agent, or Firm*—Workman Nydegger

(57) ABSTRACT

In a mobile communication system, radio channel capacity can be secured. A plurality of base stations transmit to a mobile station information X0 and the like about diversity handover, and a reference signal (such as a perch signal). The mobile station measures received quality (such as a received power) of the reference signal. The mobile station makes a decision for each of the plurality of base stations as to whether the service area is to be selected as a candidate of a service area in which the mobile station will start new communication, and/or as a candidate of a service area in which the mobile station will stop current communication.

10 Claims, 11 Drawing Sheets

U.S. PATENT DOCUMENTS

| | | | |
|---|---|---|---|
| 6,424,643 B1 * | 7/2002 | Gutowski | 370/342 |
| 6,442,151 B1 * | 8/2002 | H'mimy et al. | 370/333 |
| 6,504,828 B1 * | 1/2003 | Corbett | 370/331 |
| 6,580,910 B1 * | 6/2003 | Mazur et al. | 455/440 |
| 6,584,325 B1 * | 6/2003 | Shakhgildian | 455/525 |
| 6,611,506 B1 | 8/2003 | Huang et al. | 370/329 |
| 6,628,956 B2 * | 9/2003 | Bark et al. | 455/522 |
| 6,668,175 B1 * | 12/2003 | Almgren et al. | 455/522 |
| 6,671,265 B1 * | 12/2003 | Hwang et al. | 370/331 |
| 6,782,261 B1 * | 8/2004 | Ahmed et al. | 455/436 |
| 6,834,193 B1 * | 12/2004 | Linderborg et al. | 455/450 |
| 6,868,277 B1 * | 3/2005 | Cerwall et al. | 455/509 |
| 2001/0051524 A1 * | 12/2001 | Hunzinger | 455/442 |
| 2002/0168982 A1 * | 11/2002 | Sorokine et al. | 455/442 |

FOREIGN PATENT DOCUMENTS

| | | |
|---|---|---|
| EP | 0946076 A2 | 9/1999 |
| EP | 1049349 A1 | 11/2000 |
| JP | 09-247085 | 9/1997 |
| JP | 10-126830 | 5/1998 |
| JP | 10-191419 | 7/1998 |
| JP | 11-331912 | 11/1999 |
| JP | 2000-023229 | 1/2000 |
| JP | 2000-69533 | 3/2000 |
| JP | 2000-224650 | 8/2000 |
| JP | 2002-517144 | 6/2002 |
| WO | WO00/38455 | 6/2000 |
| WO | WO 00/54540 | 9/2000 |

* cited by examiner

DIVERSITY HANDOVER CONTROL APPARATUS AND METHOD

This application claims priority under 35 U.S.C. 119 to patent application Ser. No. 2000-302734 filed Oct. 2, 2000 in Japan, the content of which is incorporated hereinto by reference.

BACKGROUND OF THE INVENTION

1. Field of the Invention

The present invention relates to a mobile communication system, base station, mobile station and mobile communication control method.

2. Description of the Related Art

A threshold value associated with DHO (diversity handover) in conventional mobile communication is defined in a mobile station as a value common to all base stations.

FIG. 1 is a diagram illustrating a conventional method for deciding a DHO addition candidate (a candidate of a base station with which a mobile station will start new communication). Let us assume here that a base station always transmit a reference signal (such as a perch signal, for example) at fixed transmission power in addition to a signal for communicating with a mobile station. In FIG. 1, the vertical axis represents received powers of perch signals by a mobile station. A mobile station always measures received powers of perch signals from base stations, and decides a DHO addition threshold value as follows. It selects the highest received power among received powers of perch signals from multiple base stations (or a single base station) which are currently in communication with the mobile station as a reference value, and determines the received power lower than the reference value by X0 dB as the DHO addition threshold value. When a base station in non-communication (a base station which is currently not in communication with the mobile station) provides perch received power (received power of perch signal) equal to or greater than the DHO addition threshold value, the base station is selected as a DHO addition candidate. As for the example of FIG. 1, since the perch received power of the base station B is greater than the DHO addition threshold value, the base station B is selected as a DHO addition candidate. On the other hand, since the perch received power of the base station C is less than the addition threshold value, the base station C is not selected as a DHO addition candidate.

FIG. 2 is a diagram illustrating a conventional method for deciding a DHO deletion candidate (a candidate of a base station with which a mobile station will stop current communication). A mobile station always measures received powers of perch signals from base stations, and decides a DHO deletion threshold value as follows. It selects the highest received power ($V_A$ in the example of FIG. 2) among received powers of perch signals from multiple base stations (or a single base station) which are currently in communication with the mobile station as a reference value, and determines the received power lower than the reference value by Y0 dB as the DHO deletion threshold value. When a base station in communication provides perch received power equal to or less than the DHO deletion threshold value, the base station is selected as a DHO deletion candidate. As for the example of FIG. 2, since the perch received power $V_C$ of the base station C is less than the deletion threshold value, the base station C is selected as a DHO deletion candidate. On the other hand, since the perch received power $V_B$ of the base station B is greater than the deletion threshold value, the base station B is not selected as a DHO deletion candidate.

FIG. 3 is a diagram illustrating an example of deciding a DHO addition candidate in conventional control. First, let us assume that a mobile station 10 is present in the (service) area of a base station 20, and is communicating only with the base station 20. The mobile station 10 calculates the DHO addition threshold value using the value X0 dB sent from the base station 20. The mobile station 10 ignores another value X1 dB (<X0 dB) a base station 30 may send for the mobile station to calculate the DHO addition threshold value. Here, assume that the mobile station 10 is moving toward the base station 30. When the mobile station 10 approaches the base station 30 to a certain distance, the perch received power of the base station 30 exceeds the DHO addition threshold value. In FIG. 3, the reference numeral 32 designates an area where the perch received power of the base station 30 exceeds the DHO addition threshold value, and 31 designates the radius of the area 32. Thus, when the mobile station 10 enters the area 32, the base station 30 becomes a DHO addition candidate. Incidentally, if the base station 20 sends the value X1 dB for the mobile station to calculate the DHO addition threshold value, and the mobile station 10 calculates the DHO addition threshold value using the value, the base station 30 becomes a DHO addition candidate when the mobile station 10 enters an area 34.

FIG. 4 is another diagram illustrating an example of deciding a DHO addition candidate in conventional control. First, let us assume that the mobile station 10 is present in the (service) area of the base station 30, and is communicating only with the base station 30. The mobile station 10 calculates the DHO addition threshold value using the value X1 dB sent from the base station 30. The mobile station 10 ignores another value X0 dB the base station 20 may send for the mobile station to calculate the DHO addition threshold value. Here, assume that the mobile station 10 is moving toward the base station 20. When the mobile station 10 approaches the base station 20 to a certain distance, the perch received power of the base station 20 exceeds the DHO addition threshold value. In FIG. 4, the reference numeral 24 designates an area where the perch received power of the base station 20 exceeds the DHO addition threshold value, and 23 designates the radius of the area 24. Thus, when the mobile station 10 enters the area 24, the base station 20 becomes a DHO addition candidate. Incidentally, if the base station 30 sends the value X0 dB for the mobile station to calculate the DHO addition threshold value, and the mobile station 10 calculates the DHO addition threshold value using the value, the base station 20 becomes a DHO addition candidate when the mobile station 10 enters an area 22.

As for decision of a DHO deletion candidate, it is analogous to that of a DHO addition candidate.

As described above, threshold values associated with DHO in conventional mobile communication are defined in a mobile station such that they are common to all the base stations. They are not varied in real time in response to the operation of each base station. Therefore, it is impossible for a base station to overcome a shortage of the radio channel capacity even if this is possible by varying DHO addition threshold value to reduce the number of DHO branch connections of the base station when the radio channel capacity is not enough. Likewise, it is impossible for a base station to overcome a shortage of the radio channel capacity even if this is possible by varying DHO deletion threshold value to release DHO branch or branches connected to the base station.

SUMMARY OF THE INVENTION

Therefore, it is an object of the present invention to secure radio channel capacity by setting information about diversity handover of each service area of base stations so that a mobile station can decide for each service area whether the service area is to be selected as a candidate of a service area in which the mobile station will start new communication, and/or as a candidate of a service area in which the mobile station will stop current communication.

To accomplish the above mentioned object, in the first aspect of the present invention, there is provided a mobile communication system including one or more base stations each of which has one or more service areas, and a mobile station, wherein each of the base stations comprises: means for transmitting information about diversity handover of each service area to the mobile station; and means for transmitting in each service area a reference signal to the mobile station, and wherein the mobile station comprises: means for receiving the information about the diversity handover from the base station; means for receiving the reference signal from the base station, and for measuring its received quality; and means for making, for each service area, a decision as to whether the service area is to be selected as a candidate of a service area in which the mobile station will start new communication, and/or as a candidate of a service area in which the mobile station will stop current communication, in response to the received quality of the reference signal of the service area and the information about the diversity handover of the service area.

Here, each of the base stations may further comprise means for measuring for each service area an uplink interference amount to the base station, and wherein the information about the diversity handover may be determined in response to the uplink interference amount.

In the second aspect of the present invention, there is provided a base station having one or more service areas, the base station comprising: means for measuring for each service area an uplink interference amount to the base station; means for transmitting information about diversity handover of each service area determined in response to the uplink interference amount to the mobile station; and means for transmitting in each service area a reference signal to the mobile station.

In the third aspect of the present invention, there is provided a mobile station comprising: means for receiving, from one or more base stations each of which has one or more service areas, information about diversity handover of each service area; means for receiving for each service area a reference signal from the base station, and for measuring its received quality; and means for making, for each service area, a decision as to whether the service area is to be selected as a candidate of a service area in which the mobile station will start new communication, and/or as a candidate of a service area in which the mobile station will stop current communication, in response to the received quality of the reference signal of the service area and the information about the diversity handover of the service area.

In the fourth aspect of the present invention, there is provided a mobile communication control method in a mobile communication system including one or more base stations each of which has one or more service areas, and a mobile station, the mobile communication control method comprising the steps of: transmitting information about diversity handover of each service area from the base station to the mobile station; transmitting in each service area a reference signal from the base station to the mobile station; measuring received quality of the reference signal of each service area at the mobile station; and making at the mobile station, for each service area, a decision as to whether the service area is to be selected as a candidate of a service area in which the mobile station will start new communication, and/or as a candidate of a service area in which the mobile station will stop current communication, in response to the received quality of the reference signal of the service area and the information about the diversity handover of the service area.

Here, the mobile communication control method may further comprise the step of measuring at each of the base stations, for each service area, an uplink interference amount to the base station, wherein the information about the diversity handover may be determined in response to the uplink interference amount.

In the fifth aspect of the present invention, there is provided a mobile communication control method in a base station having one or more service areas, the mobile communication control method comprising the steps of: measuring for each service area an uplink interference amount to the base station; transmitting information about diversity handover of each service area determined in accordance with the uplink interference amount to the mobile station; and transmitting in each service area a reference signal to the mobile station.

In the sixth aspect of the present invention, there is provided a mobile communication control method in a mobile station, the mobile communication control method comprising the steps of: receiving, from one or more base stations each of which has one or more service areas, information about diversity handover of each service area; receiving for each service area a reference signal from the base station, and measuring its received quality; and making, for each service area, a decision as to whether the service area is to be selected as a candidate of a service area in which the mobile station will start new communication, and/or as a candidate of a service area in which the mobile station will stop current communication, in response to the received quality of the reference signal of the service area and the information about the diversity handover of the service area.

According to the foregoing configuration, radio channel capacity can be secured by setting information about diversity handover of each service area of base stations so that a mobile station can decide for each service area whether the service area is to be selected as a candidate of a service area in which the mobile station will start new communication, and/or as a candidate of a service area in which the mobile station will stop current communication.

The above and other objects, effects, features and advantages of the present invention will become more apparent from the following description of embodiments thereof taken in conjunction with the accompanying drawings.

DETAILED DESCRIPTION OF PREFERRED EMBODIMENTS

An embodiment of the present invention will now be described in detail with reference to the accompanying drawings. The present embodiment is described by way of example where each base station has a single service area.

Figure 1:
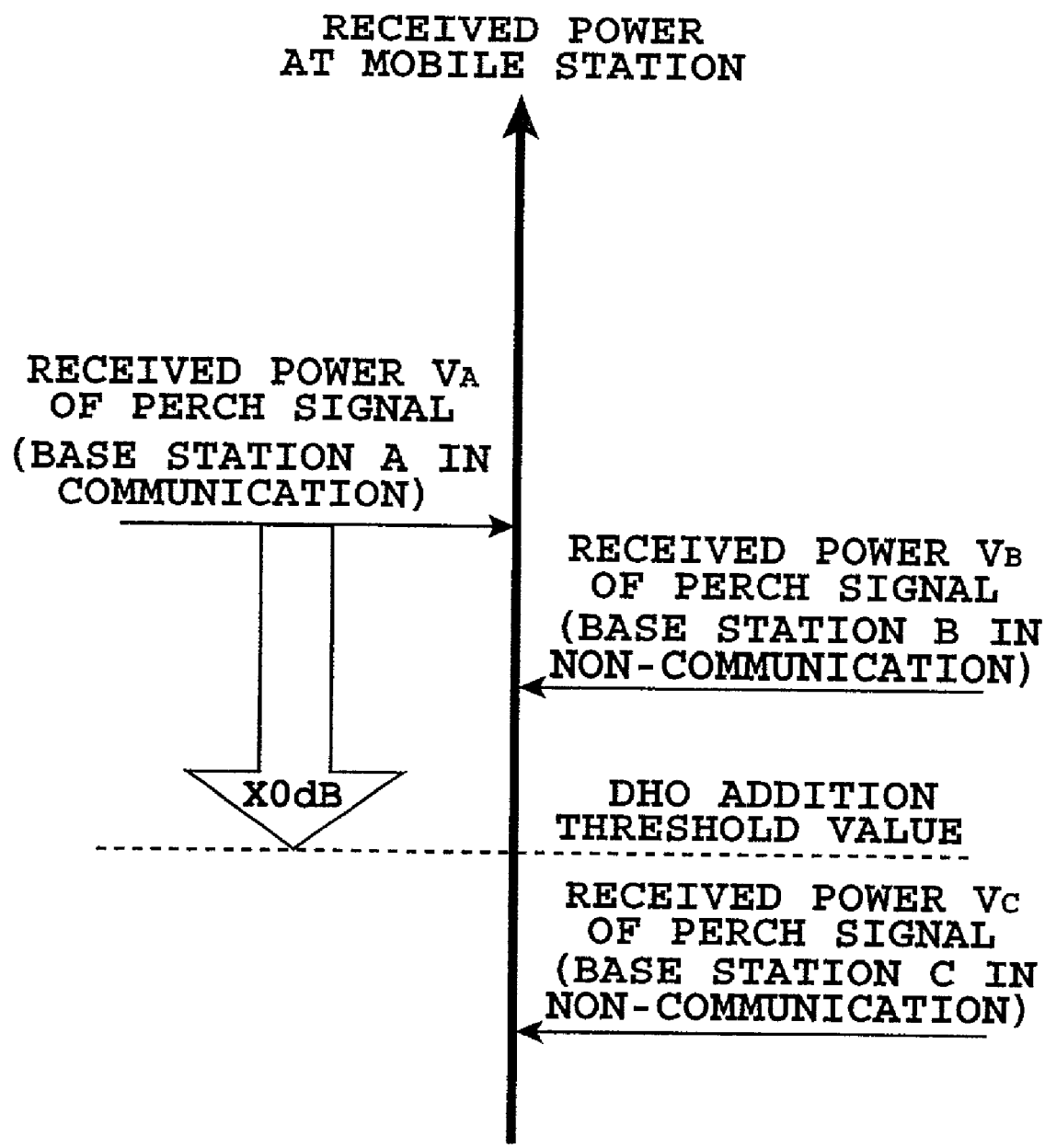
FIG. 1 is a diagram illustrating a conventional method for deciding a DHO addition candidate.
Figure 2:
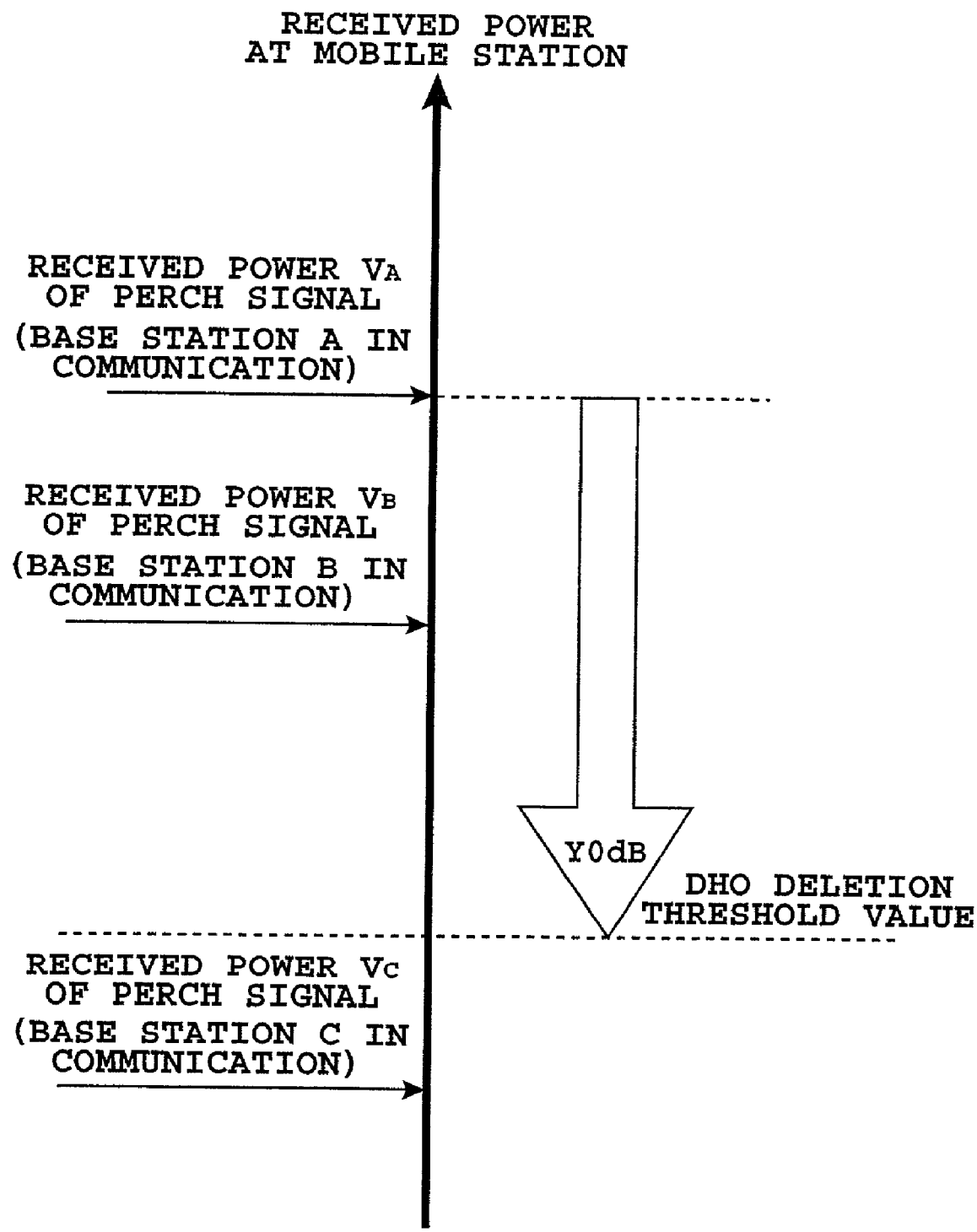
FIG. 2 is a diagram illustrating a conventional method for deciding a DHO deletion candidate.
Figure 3:
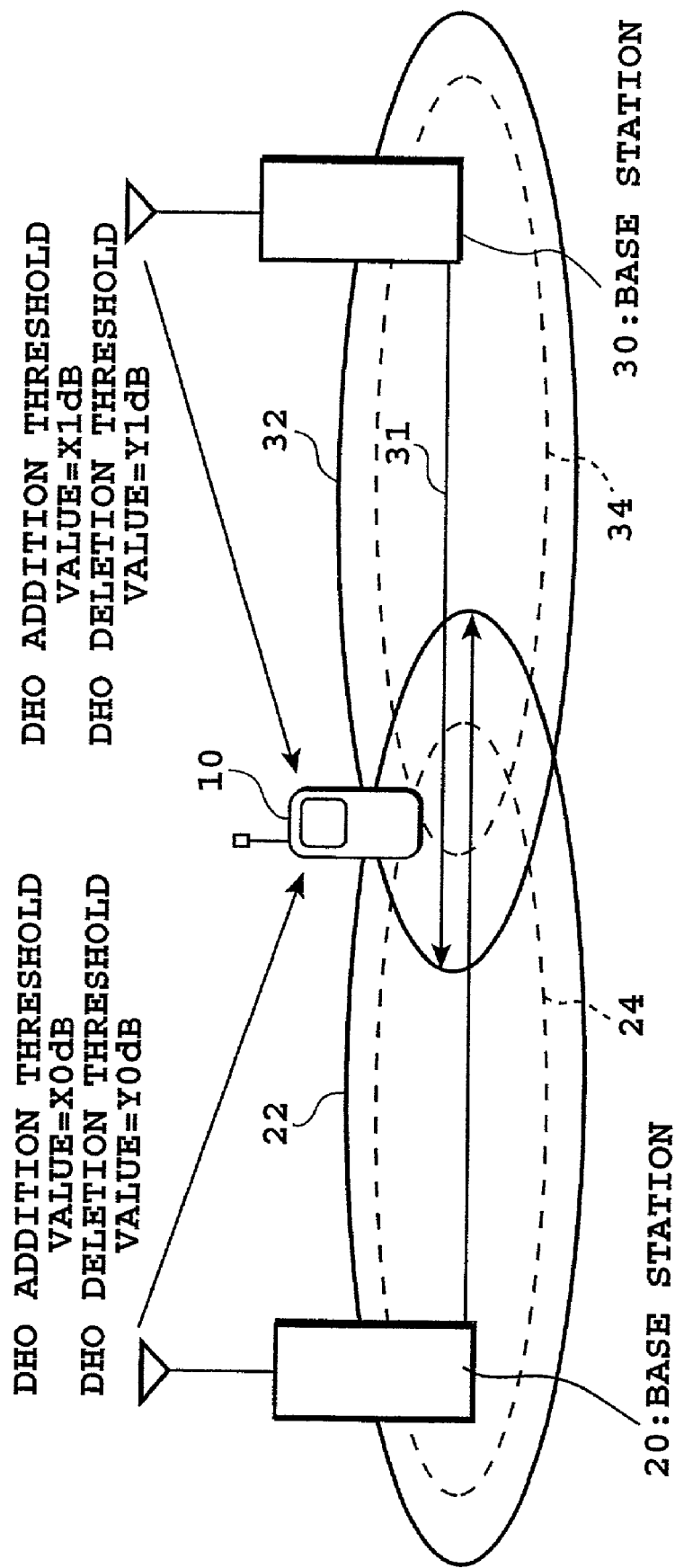
FIG. 3 is a diagram illustrating an example of deciding a DHO addition candidate in conventional control.
Figure 4:
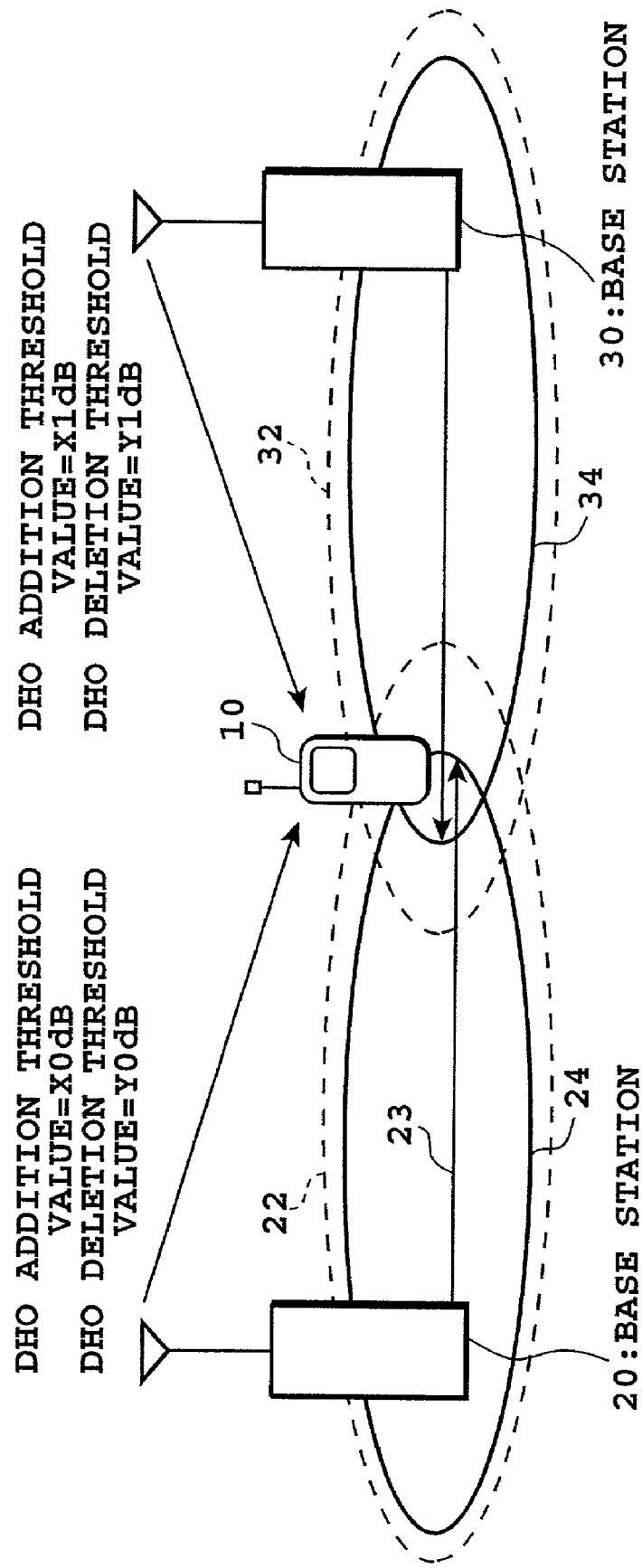
FIG. 4 is a diagram illustrating another example of deciding a DHO addition candidate in conventional control.
Figure 5:
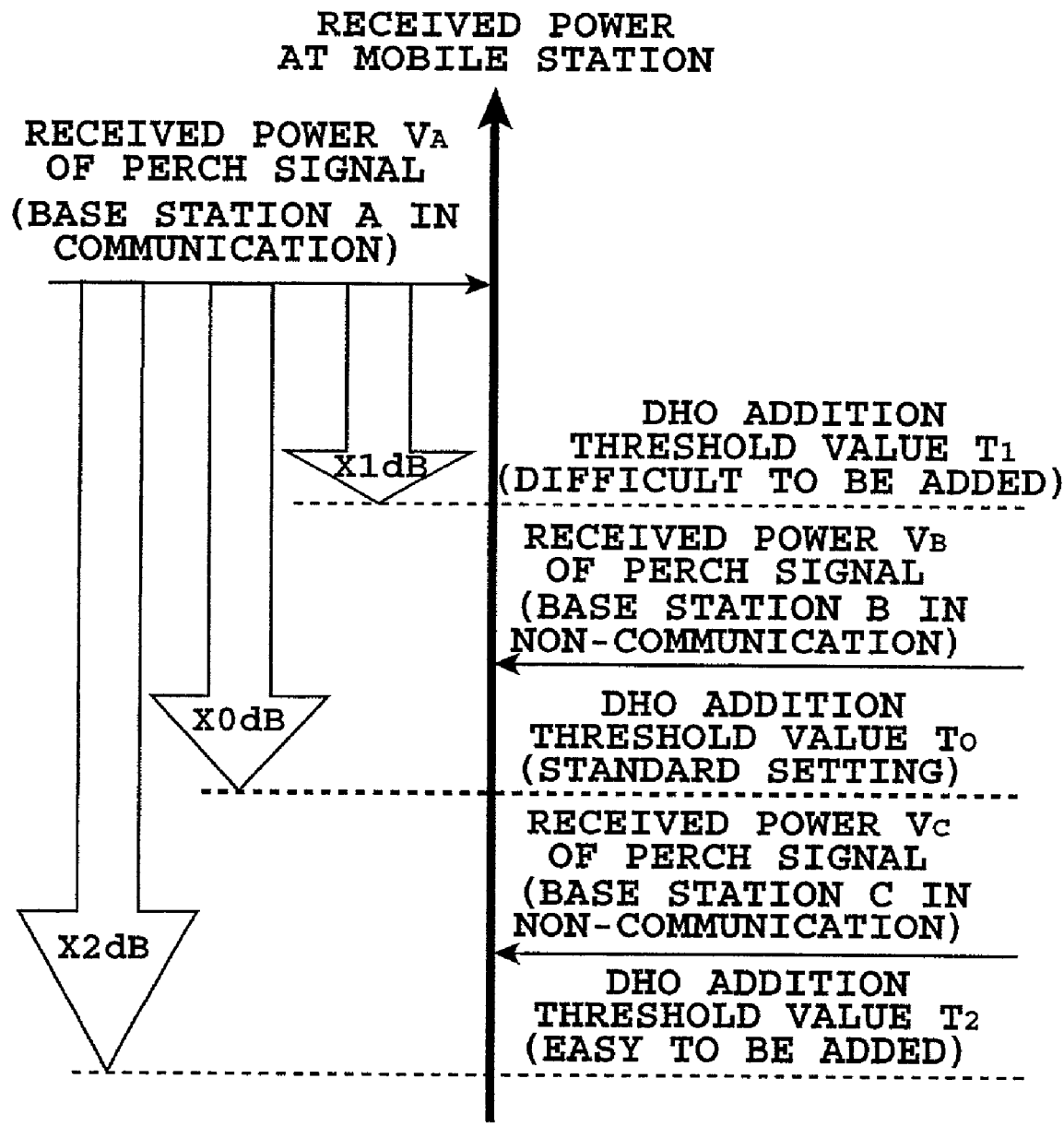
FIG. 5 is a diagram illustrating a method for deciding a DHO addition candidate in accordance with the present embodiment.
Figure 6:
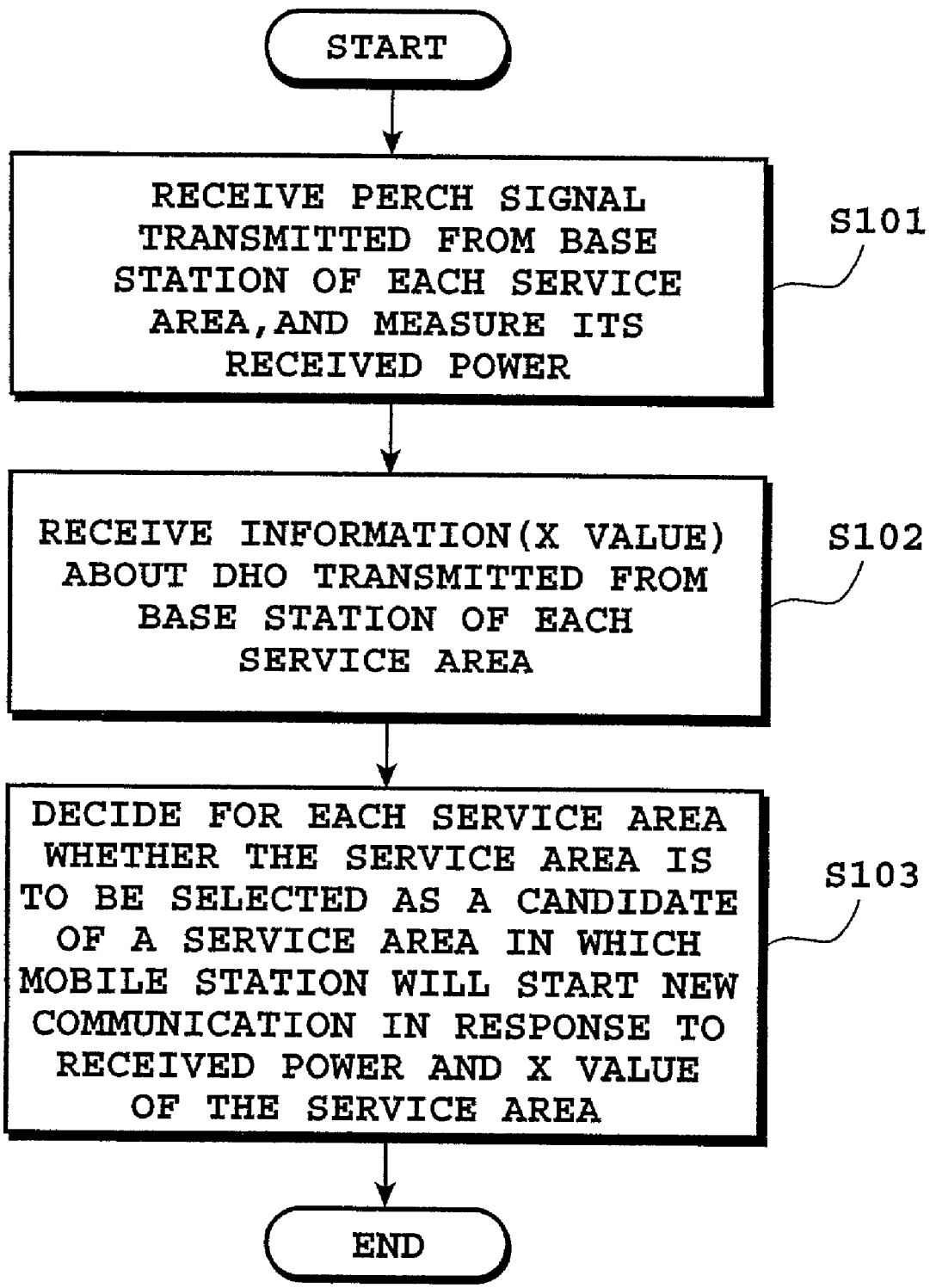
FIG. 6 is a flowchart illustrating an example of processing for deciding a DHO addition candidate in a mobile station.

FIG. 5 is a diagram illustrating a method for deciding a DHO addition candidate in accordance with the present embodiment, and FIG. 6 is a flowchart illustrating an example of processing for deciding a DHO addition candidate in a mobile station. Let us assume here that a base station always transmit a reference signal (a perch signal in the present embodiment) at a fixed transmission power in addition to a signal for communicating with a mobile station. In FIG. 5, the vertical axis represents received powers of perch signals by a mobile station. A mobile station always measures received powers of perch signals from base stations (step S101), and decides a DHO addition threshold value as follows. It selects the highest received power among received powers of perch signals from multiple base stations (or a single base station) which are currently in communication with the mobile station as a reference value, and determines the received power lower than the reference value by X dB as the DHO addition threshold value. Here, the value X differs from base station to base station. Each base station transmits its own value X to the mobile station (step S102). The value X can be transmitted with including it in the perch signal, for example. The mobile station stores the value X for each base station (service area), and carries out control for each base station (service area) using the value X of the base station (service area) (step S103).

In the example as shown in FIG. 5, $V_A$ is the highest received power among the perch received powers of the base stations in communication. When the value $X_B$, the value X of the base station B in non-communication, is $X_0$, the DHO addition threshold value is $T_0$. Since $V_B$ is greater than $T_0$, the base station B (or its service area) becomes a DHO addition candidate. When the value $X_B$ is $X_2$, the base station B also becomes a DHO addition candidate. However, when the value $X_B$ is $X_1$, since the value $V_B$ is less than the DHO addition threshold value $T_1$, the base station B does not become a DHO addition candidate. As for the base station C in non-communication, when the value $X_C$, the value X of the base station C, is $X_2$, the base station C becomes a DHO addition candidate. However, when the value $X_C$ is $X_0$ or $X_1$, the base station C does not become a DHO addition candidate.

Each base station can adjust the number of mobile stations connected to the base station by varying the value X. When the radio channel capacity is not enough, it can reduce the number of mobile stations connected thereto by reducing the value X. The base station can determine the value X by measuring an uplink interference amount to the base station.

Figure 7:
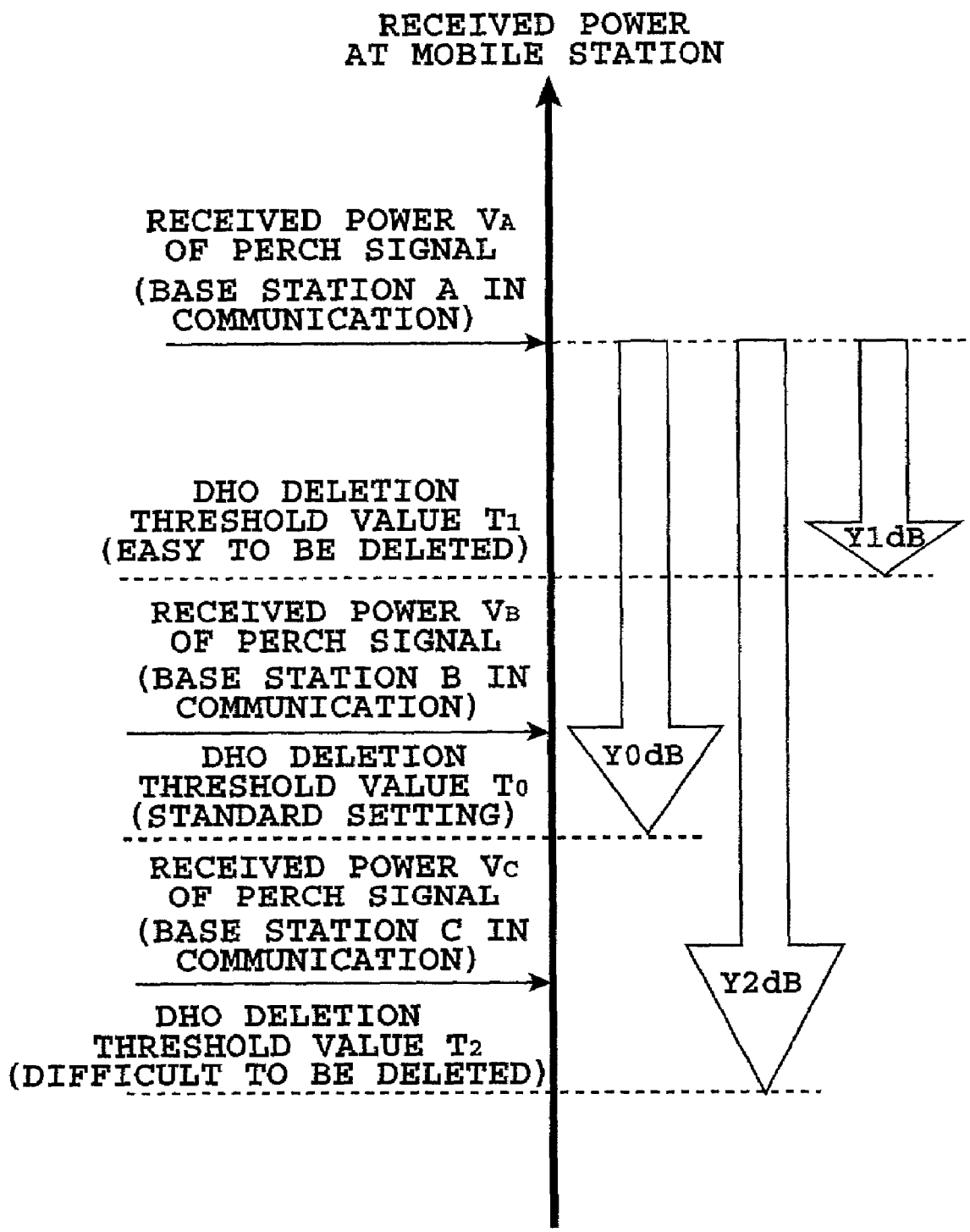
FIG. 7 is a diagram illustrating a method for deciding a DHO deletion candidate in accordance with the present embodiment.
Figure 8:
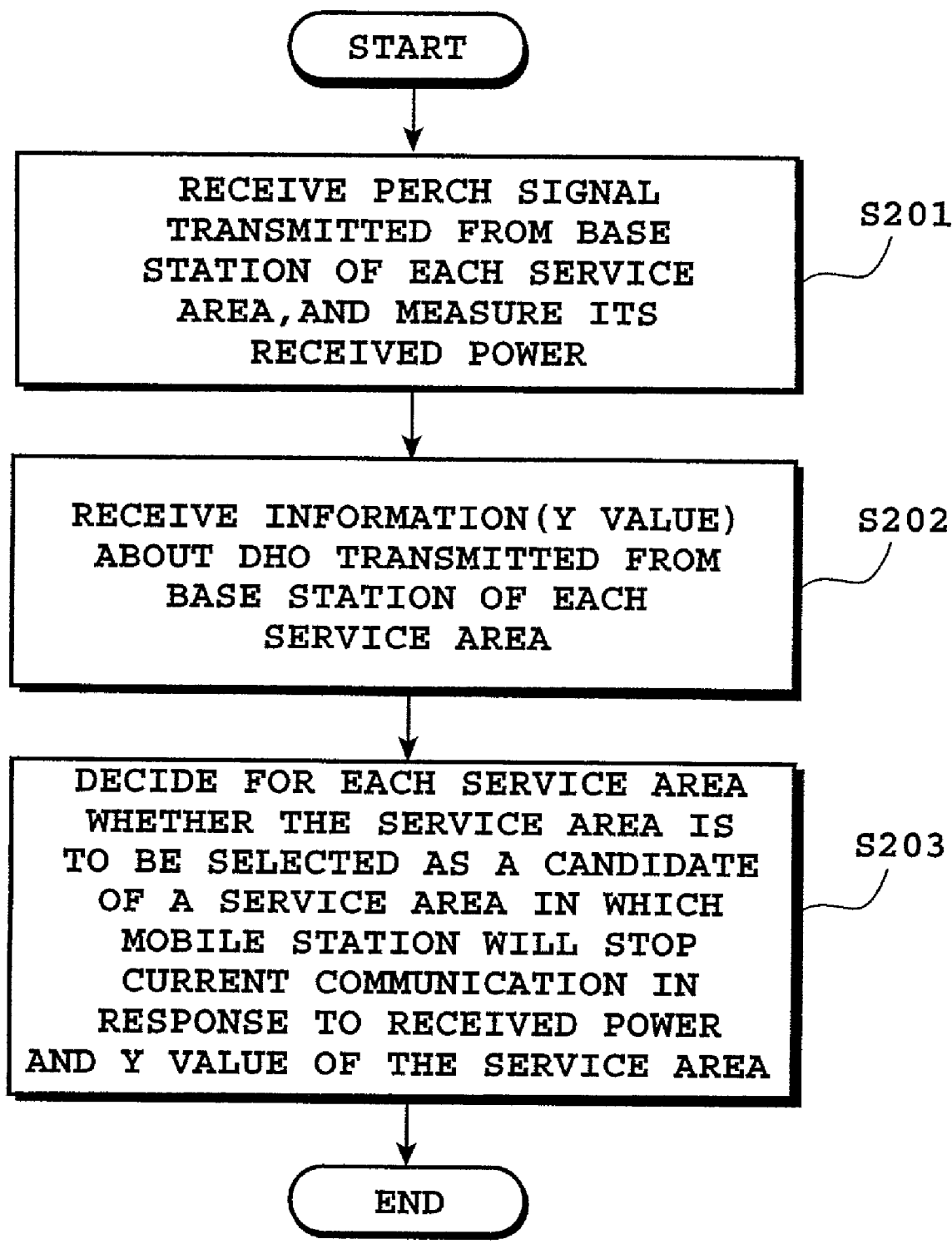
FIG. 8 is a flowchart illustrating an example of processing for deciding a DHO deletion candidate in a mobile station.

FIG. 7 is a diagram illustrating a method for deciding a DHO deletion candidate in accordance with the present embodiment, and FIG. 8 is a flowchart illustrating an example of processing for deciding a DHO deletion candidate in a mobile station. A mobile station always measures received powers of perch signals from base stations (step S201), and decides a DHO deletion threshold value as follows. It selects the highest received power among received powers of perch signals from multiple base stations (or a single base station) which are currently in communication with the mobile station as a reference value, and determines the received power lower than the reference value by Y dB as the DHO deletion threshold value. Here, the value Y differs from base station to base station. Each base station transmits its own value Y to the mobile station (step S202). The value Y can be transmitted with including it in the perch signal, for example. The mobile station stores the value Y for each base station (service area), and carries out control for each base station (service area) using the value Y of the base station (service area) (step S203).

In the example as shown in FIG. 7, $V_A$ is the highest received power among the perch received powers of the base stations in communication. When the value $Y_C$, the value Y of the base station C in communication, is $Y_0$, the DHO deletion threshold value is $T_0$. Since $V_C$ is less than $T_0$, the base station C (or its service area) becomes a DHO deletion candidate. When the value $Y_C$ is $Y_1$, the base station C also becomes a DHO deletion candidate. However, when the value $Y_C$ is $Y_2$, since the value $V_C$ is greater than the DHO deletion threshold value $T_2$, the base station C does not become a DHO deletion candidate. As for the base station B in communication, when the value $Y_B$, the value Y of the base station B, is $Y_1$, the base station B becomes a DHO deletion candidate. However, when the value $Y_B$ is $Y_0$ or $Y_2$, the base station B does not become a DHO deletion candidate.

Each base station can adjust the number of mobile stations connected to the base station by varying the value Y. When the radio channel capacity is not enough, it can reduce the number of mobile stations connected thereto by reducing the value Y. The base station can determine the value Y by measuring an uplink interference amount to the base station.

Figure 9:
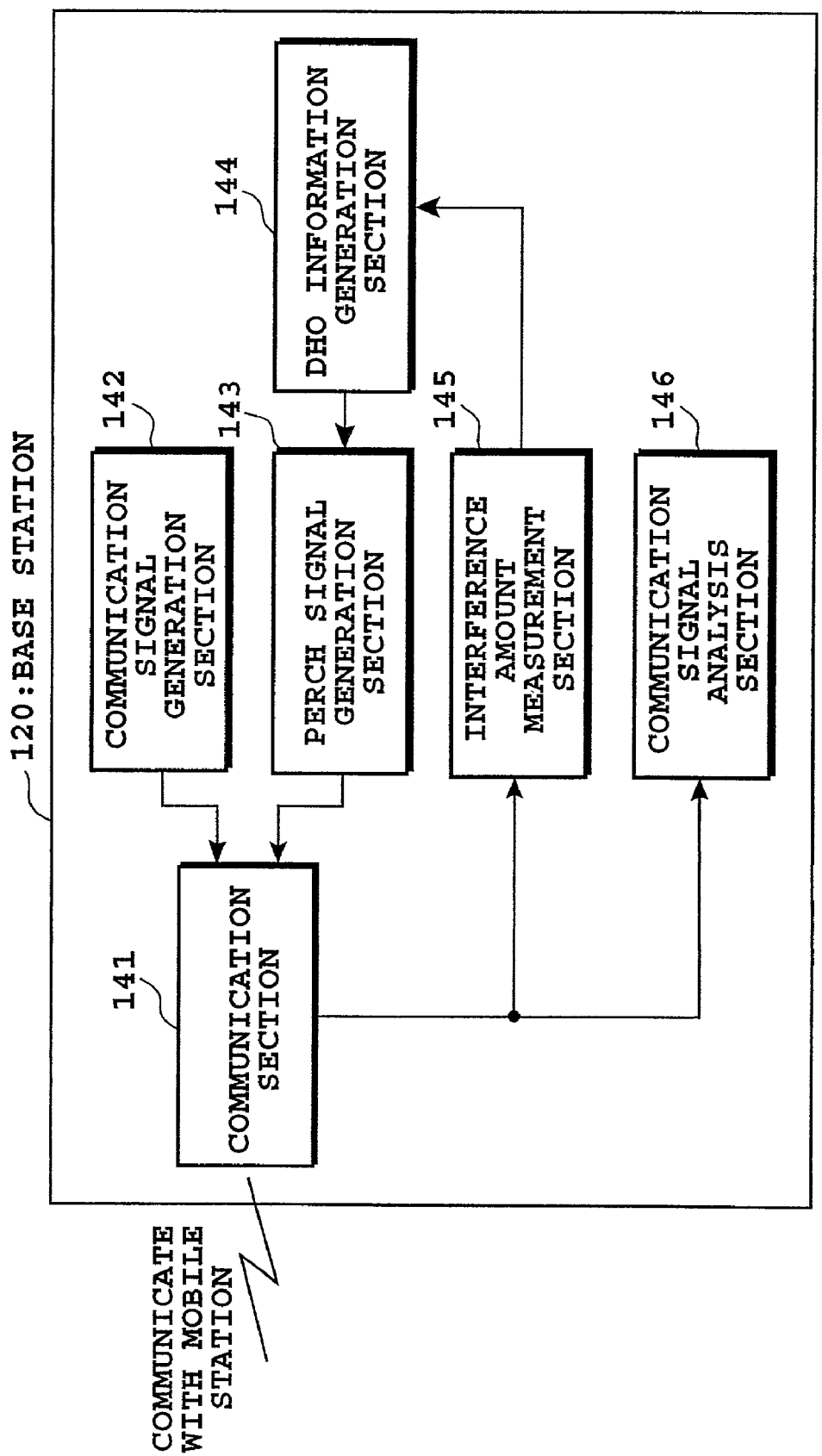
FIG. 9 is a diagram illustrating an example of configuration of a base station.

FIG. 9 is a diagram illustrating an example of configuration of a base station. A base station 120 comprises a communication section 141, a communication signal generation section 142, a perch signal generation section 143, a DHO information generation section 144, an interference amount measurement section 145, and a communication signal analysis section 146. The base station 120 communicates with a mobile station by transmitting and receiving communication signals. A communication signal generated at the communication signal generation section 142 is transmitted to the mobile station via the communication section 141. A communication signal received from the mobile station via the communication section 141 is analyzed at the communication signal analysis section 146. The base station 120 generates a perch signal at the perch signal generation section 143 and transmits it to the mobile station via the communication section 141. The perch signal includes information (the above mentioned values X and Y) about DHO generated at the DHO information generation section 144. The DHO information generation section 144 generates the information about DHO in accordance with a uplink interference amount measured at the interference amount measurement section 145.

Figure 10:
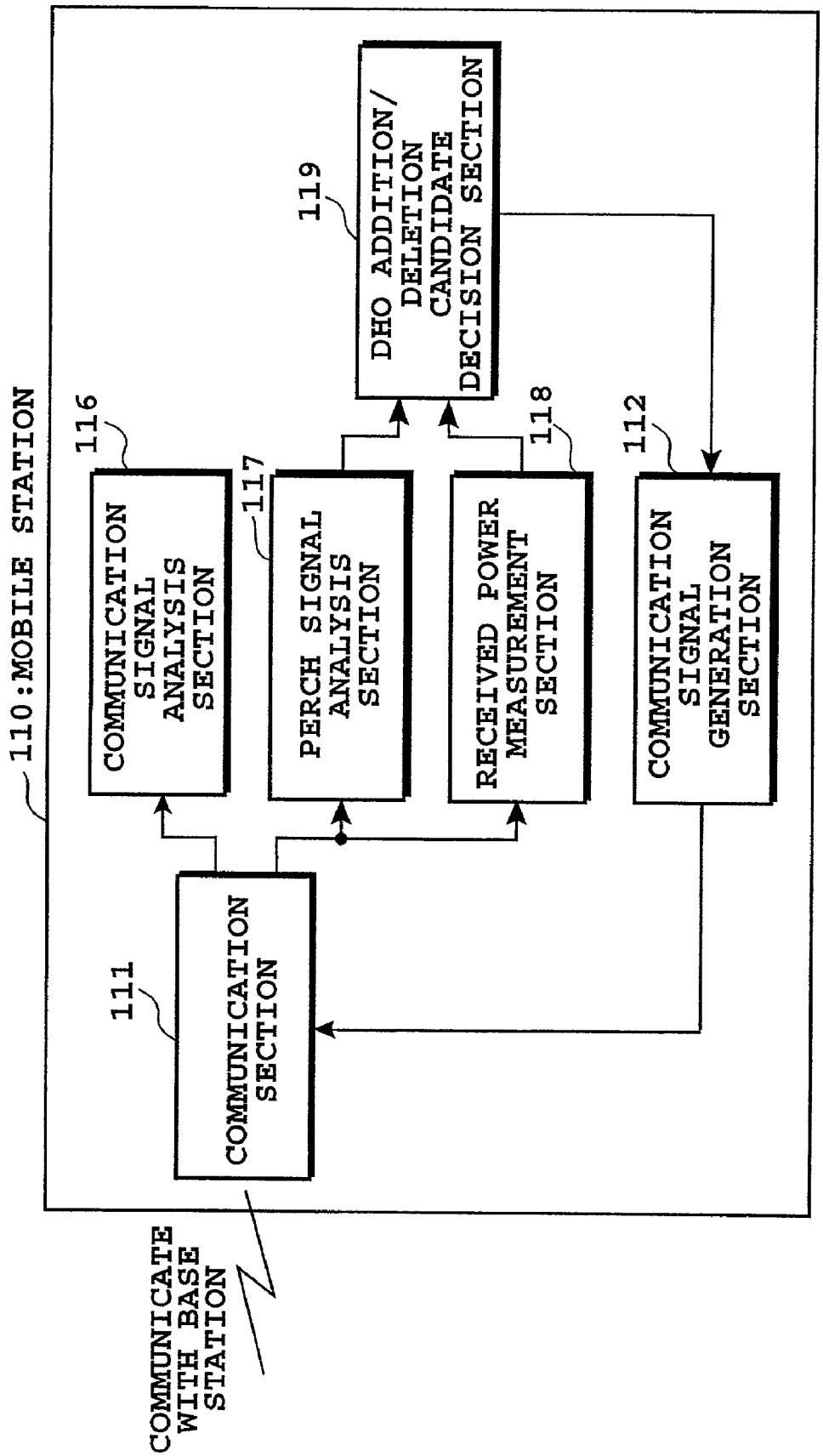
FIG. 10 is a diagram illustrating an example of configuration of a mobile station.

FIG. 10 is a diagram illustrating an example of configuration of a mobile station. A mobile station 110 comprises a communication section 111, a communication signal generation section 112, a communication signal analysis section 116, a perch signal analysis section 117, a received power measurement section 118, and a DHO addition/deletion candidate decision section 119. The mobile station 110 communicates with a base station by transmitting and receiving communication signals. A communication signal generated at the communication signal generation section 112 is transmitted to the base station via the communication section 111. A communication signal received from the base station via the communication section 111 is analyzed at the communication signal analysis section 116. The mobile station 110 analyzes a perch signal received from the base station via the communication section 111 at the perch signal analysis section 117, and obtains information about DHO included in the perch signal. A received power of the perch signal is measured at the received power measurement section 118. The DHO addition/deletion candidate decision section 119 decide whether the base station (service area) which transmitted the perch signal is to be selected as a DHO addition candidate and whether the base station (service area) which transmitted the perch signal is to be selected as a DHO deletion candidate in accordance with the obtained information about DHO and the measured received power. If the base station is selected as a DHO addition candidate, the mobile station 110 informs the base station of the selection by using a communication signal, and carries out processing for DHO addition with the base station. If the base station is selected as a DHO deletion candidate, the mobile station 110 informs the base station of the selection by using a communication signal, and carries out processing for DHO deletion with the base station.

Figure 11:
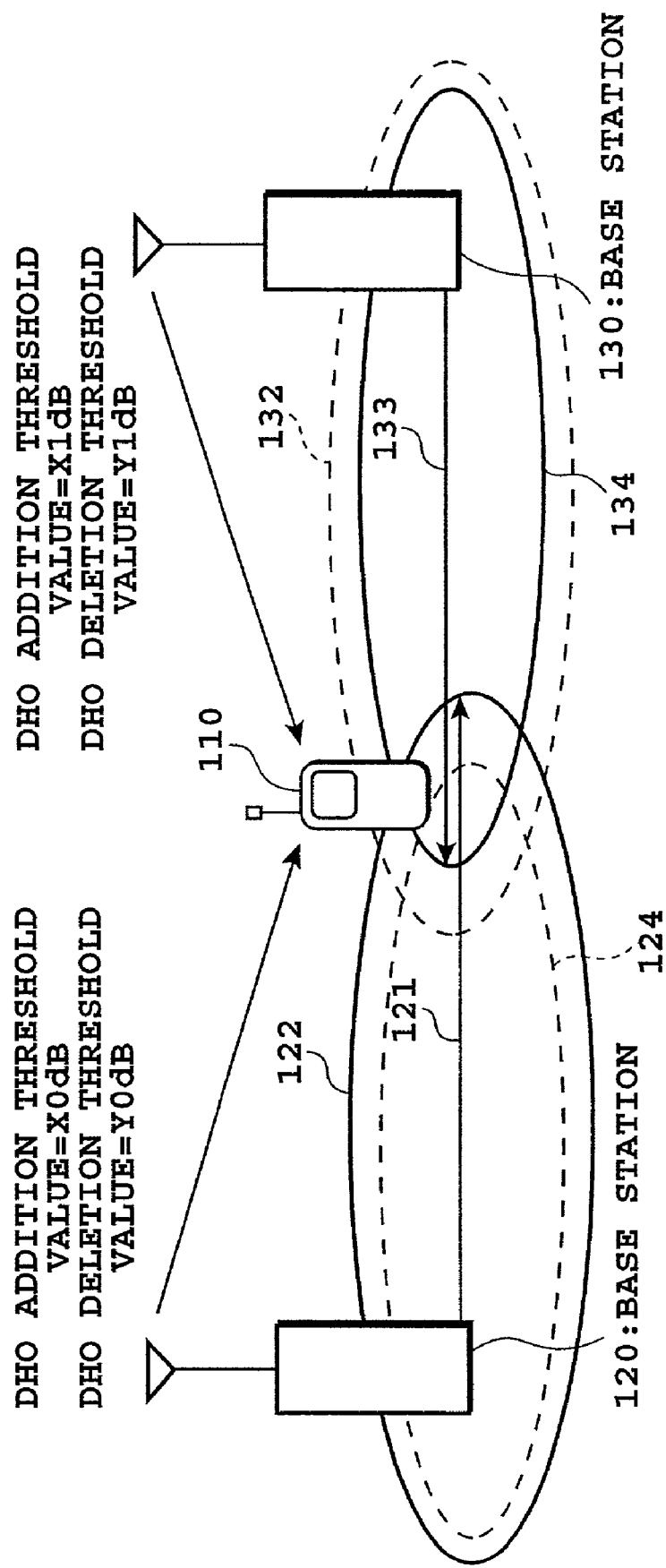
FIG. 11 is a diagram illustrating an example of deciding a DHO addition candidate in control of the present embodiment.

FIG. 11 is a diagram illustrating an example of deciding a DHO addition candidate in control of the present embodiment. An example of configuration of a base station 130 is the same as the base station 120 (FIG. 9). First, let us assume that the mobile station 110 is present in the (service) area of the base station 120, and is communicating only with the base station 120. The mobile station 110 calculates the DHO addition threshold value of the base station 120 using the value X0 dB sent from the base station 120. The mobile station 110 also calculates the DHO addition threshold value of the base station 130 using the value X1 dB (<X0 dB) sent from the base station 130. Here, assume that the mobile station 110 is moving toward the base station 130. When the mobile station 110 approaches the base station 130 to a certain distance, the perch received power of the base station 130 exceeds the DHO addition threshold value of the base station 130. In FIG. 11, the reference numeral 134 designates an area where the perch received power of the base station 130 exceeds the DHO addition threshold value of the base station 130, and 133 designates the radius of the area 134. Thus, when the mobile station 110 enters the area 134, the base station 130 becomes a DHO addition candidate. Incidentally, if the base station 130 sends the value X0 dB for the mobile station to calculate the DHO addition threshold value, and the mobile station 110 calculates the DHO addition threshold value of the base station 130 using the value, the base station 130 becomes a DHO addition candidate when the mobile station 110 enters an area 132.

Next, let us assume that the mobile station 110 is present in the (service) area of a base station 130, and is communicating only with the base station 130. The mobile station 110 calculates the DHO addition threshold value of the base station 130 using the value X1 dB sent from the base station 130. The mobile station 110 also calculates the DHO addition threshold value of the base station 120 using the value X0 dB sent from the base station 120. Here, assume that the mobile station 110 is moving toward the base station 120. When the mobile station 110 approaches the base station 120 to a certain distance, the perch received power of the base station 120 exceeds the DHO addition threshold value of the base station 120. In FIG. 11, the reference numeral 122 designates an area where the perch received power of the base station 120 exceeds the DHO addition threshold value of the base station 120, and 121 designates the radius of the area 122. Thus, when the mobile station 110 enters the area 122, the base station 120 becomes a DHO addition candidate. Incidentally, if the base station 120 sends the value X1 dB for the mobile station to calculate the DHO addition threshold value, and the mobile station 110 calculates the DHO addition threshold value of the base station 120 using the value, the base station 120 becomes a DHO addition candidate when the mobile station 110 enters an area 124.

As for decision of a DHO deletion candidate, it is analogous to that of a DHO addition candidate.

Although the present embodiment makes a decision of a DHO addition candidate and a DHO deletion candidate using a received power of a perch signal. However, for example, it is possible to use other indices indicating received quality of a perch signal such as a propagation loss (a transmission power of a perch signal minus a received power of the perch signal) and a received SIR (Signal-to-Interference power Ratio) to decide a DHO addition candidate and a DHO deletion candidate. The transmission power of the perch signal may be fixed, or information about it can be transmitted to a mobile station with including it in the perch signal.

Although the foregoing description is made by way of example where each base station has a single service area, the present invention is applicable to a case where a base station has two or more service areas. In that case, the base station transmits to a mobile station information about the diversity handover of each service area, and a reference signal in each service area. The mobile station measures for each service area a received power, a propagation loss, a received SIR and the like of the reference signal, and makes a decision for each service area as to whether the service area is to be selected as a candidate of a service area in which the mobile station will start new communication (DHO addition candidate), and/or as a candidate of a service area in which the mobile station will stop current communication (DHO deletion candidate).

As an example where a single base station has two or more service areas, the base station can have six sectors (service areas) of 60 (=360/6) degrees. In configuration of areas of mobile telephony, six sectors of 60 degrees or three sectors of 120 degrees are widely used.

As described above, according to the present invention, radio channel capacity can be secured by setting information about diversity handover of each service area of base stations so that a mobile station can decide for each service area whether the service area is to be selected as a candidate of a service area in which the mobile station will start new communication, and/or as a candidate of a service area in which the mobile station will stop current communication.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A mobile communication system including one or more base stations each of which has one or more service areas, and a mobile station, wherein each of said base stations comprises:
    means for determining information about an addition threshold value and/or a deletion threshold value for diversity handover of each service area;
    means for transmitting said information about an addition threshold value and/or a deletion threshold value for diversity handover of each service area to said mobile station; and
    means for transmitting in each service area a reference signal to said mobile station, and wherein
said mobile station comprises:
    means for receiving said information about an addition threshold value and/or a deletion threshold value for diversity handover from the base station;
    means for receiving said reference signal from the base station, and for measuring its received quality; and
    means for making, for each service area, a decision as to whether the service area is to be selected as a candidate of a service area in which said mobile station will start new communication, and/or as a candidate of a service area in which said mobile station will stop current communication, by comparing the received quality of the reference signal of the service area with an addition threshold value and/or a deletion threshold value obtained from information about an addition threshold value and/or a deletion threshold value for diversity handover of the service area.

2. The mobile communication system as claimed in claim 1, wherein said means for determining comprises means for measuring for each service area an uplink interference amount to the base station, and determines said information about an addition threshold value and/or a deletion threshold value for diversity handover in response to said uplink interference amount.

3. The mobile communication system as claimed in claim 1, wherein said means for determining obtains a reference received quality from the measured received qualities, and obtains the addition threshold value and/or the deletion threshold value for each service area from the reference received quality and the information about an addition threshold value and/or a deletion threshold value for diversity handover of the service area.

4. A mobile station comprising:
    means for receiving, from one or more base stations each of which has one or more service areas, information about an addition threshold value and/or a deletion threshold value for diversity handover of each service area;
    means for receiving for each service area a reference signal from the base station, and for measuring its received quality; and
    means for making, for each service area, a decision as to whether the service area is to be selected as a candidate of a service area in which said mobile station will start new communication, and/or as a candidate of a service area in which said mobile station will stop current communication, by comparing the received quality of the reference signal of the service area with an addition threshold value and/or a deletion threshold value obtained from information about an addition threshold value and/or a deletion threshold value for diversity handover of the service area.

5. The mobile station as claimed in claim 4, wherein said means for determining obtains a reference received quality from the measured received qualities, and obtains the addition threshold value and/or the deletion threshold value for each service area from the reference received quality and the information about an addition threshold value and/or a deletion threshold value for diversity handover of the service area.

6. A mobile communication control method in a mobile communication system including one or more base stations each of which has one or more service areas, and a mobile station, said mobile communication control method comprising the steps of
    determining information about an addition threshold value and/or a deletion threshold value for diversity handover of each service area;
    transmitting said information about an addition threshold value and/or a deletion threshold value for diversity handover of each service area from the base station to said mobile station;
    transmitting in each service area a reference signal from the base station to said mobile station;
    measuring received quality of said reference signal of each service area at said mobile station; and
    making at said mobile station, for each service area, a decision as to whether the service area is to be selected as a candidate of a service area in which said mobile station will start new communication, and/or as a candidate of a service area in which said mobile station will stop current communication, by comparing the received quality of the reference signal of the service area with an addition threshold value and/or a deletion threshold value obtained from information about an addition threshold value and/or a deletion threshold value for diversity handover of the service area.

7. The mobile communication control method as claimed in claim 6, wherein said step of determining comprises the step of measuring, for each service area, an uplink interference amount to the base station, and determines said information about an addition threshold value and/or a deletion threshold value for diversity handover in response to said uplink interference amount.

8. The mobile communication control method as claimed in claim 6, wherein said step of determining obtains a reference received quality from the measured received qualities, and obtains the addition threshold value and/or the deletion threshold value for each service area from the reference received quality and the information about an addition threshold value and/or a deletion threshold value for diversity handover of the service area.

9. A mobile communication control method in a mobile station, said mobile communication control method comprising the steps of:
    receiving, from one or more base stations each of which has one or more service areas, information about an addition threshold value and/or a deletion threshold value for diversity handover of each service area;
    receiving for each service area a reference signal from the base station, and measuring its received quality; and
    making, for each service area, a decision as to whether the service area is to be selected as a candidate of a service area in which said mobile station will start new communication, and/or as a candidate of a service area in which said mobile station will stop current communication, by comparing the received quality of the reference signal of the service area with an addition threshold value and/or a deletion threshold value obtained from information about an addition threshold value and/or a deletion threshold value for diversity handover of the service area.

10. The mobile communication control method as claimed in claim 9, wherein said step of determining obtains a reference received quality from the measured received qualities, and obtains the addition threshold value and/or the deletion threshold value for each service area from the reference received quality and the information about an addition threshold value and/or a deletion threshold value for diversity handover of the service area.

* * * * *

UNITED STATES PATENT AND TRADEMARK OFFICE
CERTIFICATE OF CORRECTION

PATENT NO. : 7,184,769 B2 Page 1 of 1
APPLICATION NO. : 09/968288
DATED : February 27, 2007
INVENTOR(S) : Tsutsumi et al.

It is certified that error appears in the above-identified patent and that said Letters Patent is hereby corrected as shown below:

<u>Column 5</u>
Line 50, change "with" to --by--

<u>Column 7</u>
Line 28, change "decide' to --decides--

<u>Column 10</u>
Line 17, after "steps of" insert --:--

Signed and Sealed this

First Day of July, 2008

JON W. DUDAS
*Director of the United States Patent and Trademark Office*